(12) United States Patent
Policy et al.

(10) Patent No.: US 8,575,858 B2
(45) Date of Patent: Nov. 5, 2013

(54) METHODS AND SYSTEMS FOR MINIMIZING LIGHT SOURCE POWER SUPPLY COMPATIBILITY ISSUES

(75) Inventors: Richard Policy, Urbana, OH (US); William Tyson, III, Urbana, OH (US); Stan Hodge, Hilliard, OH (US); Brian Barnhart, Carlisle, OH (US)

(73) Assignee: Honeywell International Inc., Morristown, NJ (US)

( * ) Notice: Subject to any disclaimer, the term of this patent is extended or adjusted under 35 U.S.C. 154(b) by 906 days.

(21) Appl. No.: 12/708,887

(22) Filed: Feb. 19, 2010

(65) Prior Publication Data

US 2011/0204816 A1    Aug. 25, 2011

(51) Int. Cl.
*H05B 37/00* (2006.01)
(52) U.S. Cl.
USPC ............ 315/294; 315/291; 315/297; 315/312
(58) Field of Classification Search
USPC .................................. 315/291, 294, 297, 312
See application file for complete search history.

(56) References Cited

U.S. PATENT DOCUMENTS

| 5,783,909 | A | 7/1998 | Hochstein |
| 6,127,784 | A | 10/2000 | Grossman et al. |
| 6,841,947 | B2 | 1/2005 | Berg-johansen |
| 2007/0040696 | A1* | 2/2007 | Mubaslat et al. ............. 340/657 |
| 2007/0145915 | A1* | 6/2007 | Roberge et al. ................ 315/312 |
| 2009/0102397 | A1* | 4/2009 | Chang et al. .................. 315/294 |
| 2009/0267540 | A1* | 10/2009 | Chemel et al. ................ 315/297 |

* cited by examiner

Primary Examiner — Douglas W Owens
Assistant Examiner — Jonathan Cooper
(74) Attorney, Agent, or Firm — Ingrassia Fisher & Lorenz, P.C.

(57) ABSTRACT

Systems and methods for allowing replacement of updated light heads with different design parameters to become independent of the remote power supply. An exemplary light system includes a light head remote from a power supply component. The light head includes one or more light-emitting diodes (LEDs) or other light emitting devices, a memory that stores configuration information and a communication component. The power supply component includes a power converter, a memory, and a controller. The power converter outputs an electrical signal for driving the one or more LEDs. The memory stores light head configuration information. The controller receives configuration information from the communication component via the data bus, generates and sends instructions, based on at least one of the configuration information stored in the power supply component memory or the configuration information received from the light head, to the power converter.

17 Claims, 3 Drawing Sheets

METHODS AND SYSTEMS FOR MINIMIZING LIGHT SOURCE POWER SUPPLY COMPATIBILITY ISSUES

BACKGROUND OF THE INVENTION

Presently, an aircraft remote power supply that powers light source emitters that reside in a light head may require replacement at the same time as the light source emitter assembly. These remote power supplies can be located in a separate sub assembly or on a different circuit card assembly from the light source emitters within the light head. Reasons for this simultaneous replacement are as follows.

1. When the light source has a different brightness level than those originally installed, the new brightness level may require less drive current and/or voltage to maintain the same light output as the older brightness level.
2. When the number of light source emitters in the light head changes.
3. When the drive voltage of the light source changes in the newer light head.

SUMMARY OF THE INVENTION

The present invention allows replacement of updated light heads with different light source emitters design parameters (number of, current, voltage, etc.) to become independent of the remote power supply. Examples light source emitters are, but not limited to, light emitting diode (LED), halogen bulbs, and xenon flash tubes.

An exemplary light system includes a light head remote from a power supply component. The light head includes one or more light source emitters, a memory that stores configuration information for the one or more light source emitters, and a communication component that is in signal communication with the memory and the data bus. The power supply component includes a power converter, a memory, and a controller. The power converter receives an input electrical signal, converts the received electrical signal, and sends the converted electrical signal to the light head for driving the one or more light source emitters. The memory stores light head configuration information. The controller receives configuration information from the communication component via the data bus, generates instructions based on at least one of the configuration information stored in the power supply component memory or the configuration information received from the light head, and sends the generated instructions to the power converter.

In one aspect of the invention, the controller overwrites the configuration information stored in the power supply component memory if the configuration information from the light head is different from the configuration information previously stored in the power supply component memory.

In another aspect of the invention, the controller determines if the configuration information from the light head is valid and overwrites only if the configuration information is determined valid.

In still another aspect of the invention, the configuration information includes at least one of two or more operational modes, light source emitter drive current, flash pattern information, or drive voltage of the light source emitters(s).

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
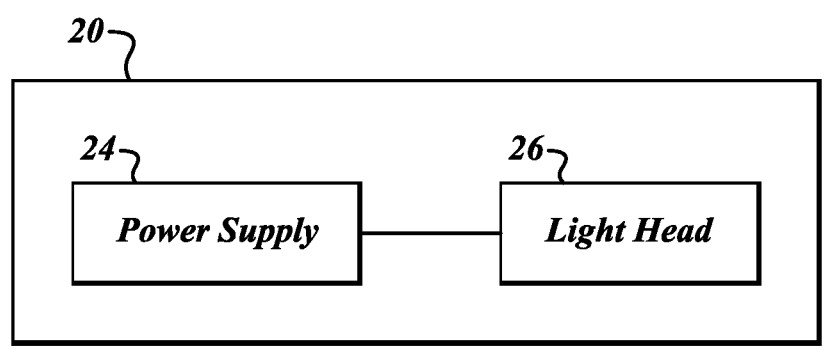
FIGS. 1 and 2 illustrate a light system formed in accordance with an embodiment of the present invention.

FIG. 1 shows an exemplary system 20 that allows for the replacement of a light package (light head) 26 without having to replace a corresponding power supply 24. When the new light head 26 is attached to the power supply 24, the light head 26 sends parameter/configuration information to the power supply 24 via a data bus. The power supply 24 adjusts its output based on the received parameter/configuration information.

Figure 2:
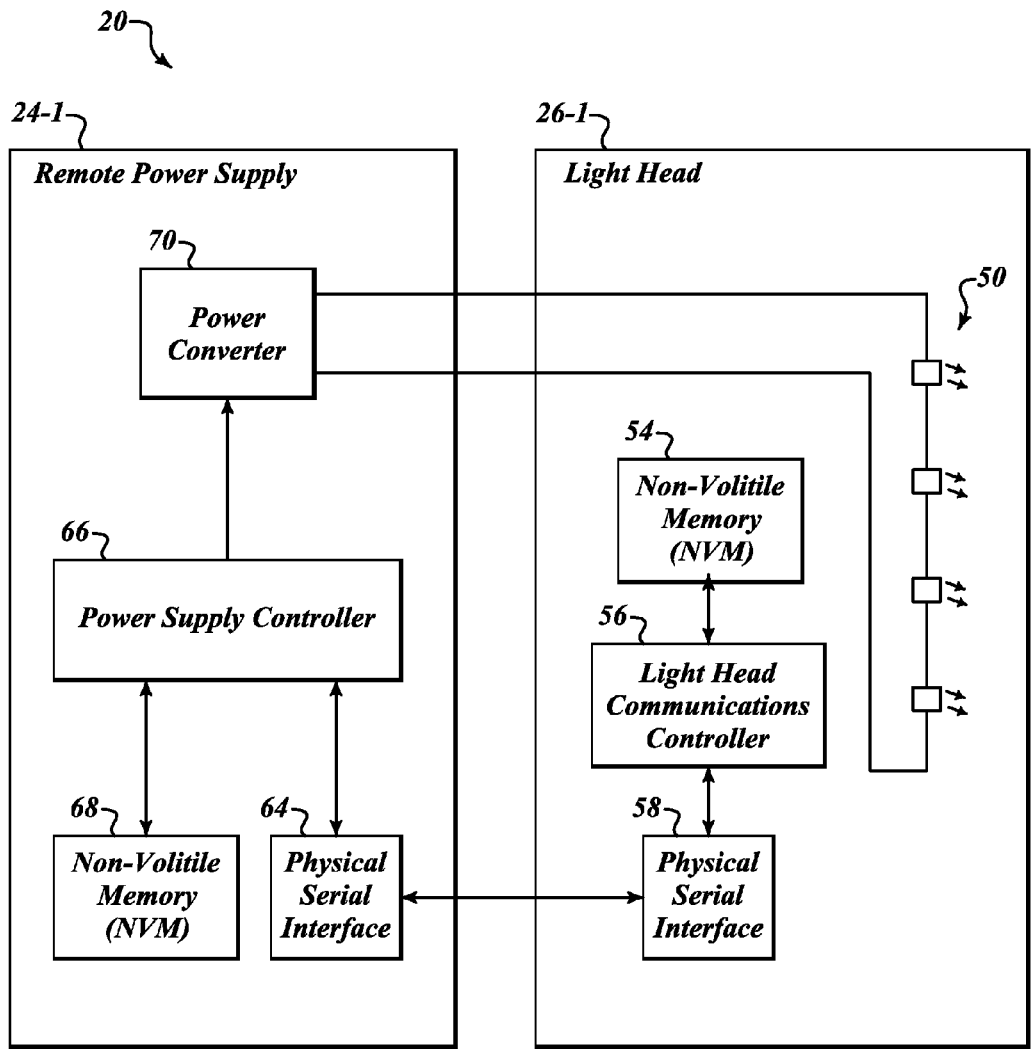
Figure 3:
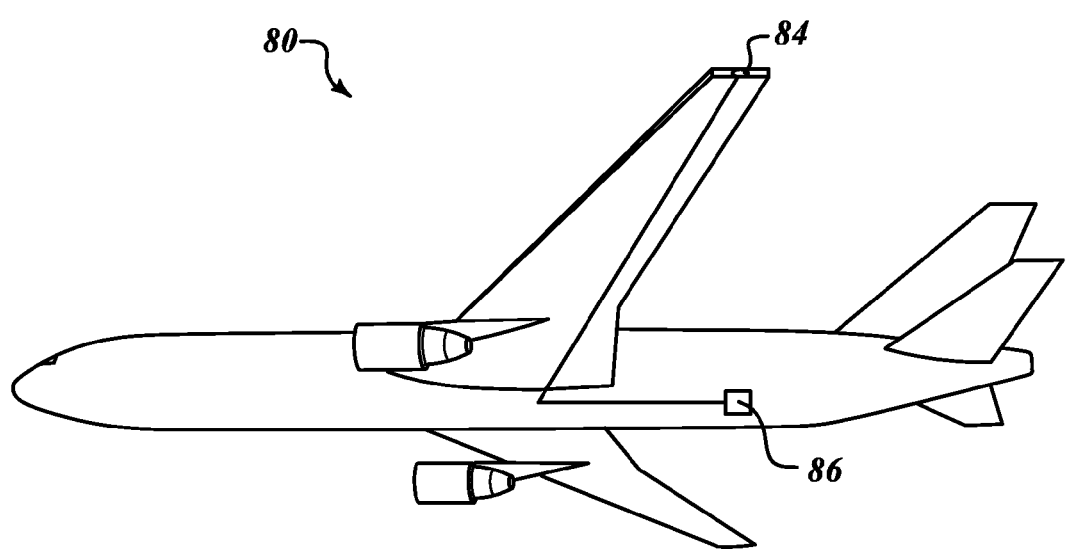
FIG. 3 illustrates an aircraft having the light system shown in FIGS. 1 and 2.

As shown in FIG. 2, the light head 26 includes one or more light source emitters 50, a nonvolatile memory (NVM) 54, a light head communications controller 56, and an interface component 58. The remote power supply 24 includes an interface component 64, NVM 68, a power supply controller 66, and a power converter 70. The power converter 70 is electrically coupled to the light source emitter(s) 50. The interfaces 58, 64 are in data communication via a data bus.

The NVM 54 stores configuration data for the light source emitter(s) 50. The stored parameter/configuration information can include but is not limited to:
  modes of operation of the system;
  required current to drive the light source emitter(s) 50;
  flash rate and duty cycle of any flash pattern required by the system;
  forward voltage of the light source emitter(s) 50;
  light source emitter life data; and
  light source operating temperature.

The light head communications controller 56 transmits stored light head configuration data (parameter/configuration information) to the remote power supply 24 via the interface 58.

The power supply controller 66 validates all incoming data from the light head 26. The validation may include but is not limited to:
  cyclical redundancy check (CRC); and
  checksum.

The NVM 68 in the remote power supply 24 includes previously stored light source emitter parameter/configuration information. The power supply controller 66 compares the parameter/configuration information received from the interface 64 to the parameter/configuration information stored in the NVM 68. If the power supply controller 66 determines that the received parameter/configuration information is different from that stored in the NVM 68, the power supply controller 66 overwrites the parameter/configuration information stored in the NVM 68 with the new parameter/configuration information received from the light head 26. The overwrite condition automatically occurs when a new light head with different light source emitter characteristics replaces an old light head.

The NVM 68 includes parameter/configuration information used by the power supply controller 66. This parameter/configuration information may include:
  modes of operation of the system;
  required current to drive the light source emitter(s) 50;
  flash rate and duty cycle of any flash pattern required by the system; and/or
  forward voltage of the light source emitter(s) 50.

The power supply controller 66 controls the output of the power converter 70. Output of the power converter 70 may provide:

required current to drive the light source emitter(s) 50;

flash rate and duty cycle of any flash pattern mode of operation;

required voltage to drive the light source emitter(s) 50; and/or life data.

The power converter 70 converts a remote power supply input voltage to the voltage and current that the light source emitters 50 require, based on an instruction(s) from the power supply controller 66. The power supply controller 66 generates the instruction(s) based on the parameter/configuration information stored in the NVM 68 after overwriting.

In one embodiment, the interfaces 58 and 64 are physical serial interfaces that are used as a transmission medium between the remote power supply 24 and light head 26. Examples of physical interfaces are RS422/RS485, RS232, ARINC 429, and CAN bus. The physical interfaces are not limited to those described above.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A light system having a data bus, the system comprising:
    a light head comprising:
        one or more light source emitters;
        a memory configured to store configuration information for the one or more light source emitters; and
        a communication component being in signal communication with the memory and the data bus; and
    a power supply component comprising:
        a power converter configured to receive an input electrical signal, convert the received electrical signal, and send the converted electrical signal to the light head for driving the one or more light source emitters;
        a memory configured to store light head configuration information; and
        a controller configured to receive configuration information from the communication component via the data bus, generate instructions based on at least one of the configuration information stored in the power supply component memory or the configuration information received from the light head, and send the generated instructions to the power converter,
    wherein the controller is further configured to overwrite the configuration information stored in the power supply component memory if the configuration information from the light head is different from the configuration information previously stored in the power supply component memory.

2. The system of claim 1, wherein the light source emitters comprise light emitting diodes (LEDs).

3. The system of claim 1, wherein the controller is further configured to determine if the configuration information from the light head is valid.

4. The system of claim 1, wherein the communication component of the light head and the power supply component comprise a serial interface.

5. The system of claim 1, wherein the memory in the light head and in the power supply component is nonvolatile memory.

6. The system of claim 1, wherein the configuration information comprises at least one of two or more operational modes, drive current, flash pattern information, or forward voltage.

7. The system of claim 6, wherein the configuration information further comprises light source emitter life data and junction temperature information.

8. The system of claim 1, wherein the power supply component is remotely located from the light head or integral with the light head.

9. The system of claim 8, wherein the power supply component is located in an avionics bay of an aircraft and the light head is at least one of an anti-collision light or landing light.

10. A method comprising:
    storing light source emitter configuration information in memory located in a light head;
    sending the stored light source emitter configuration information to a power supply component via a data bus;
    receiving the sent light source emitter configuration information at the power supply component;
    receiving an input electrical signal at a power converter in the power supply component;
    storing light source emitter configuration information in a memory associated with the power supply component; and
    converting the received electrical signal based on at least one of the configuration information stored in the power supply component memory or the configuration information received from the light head;
    applying the converted electrical signal to one or more light source emitters associated with the light head; and
    overwriting the configuration information stored in the power supply component memory if the configuration information from the light head is different from the configuration information previously stored in the power supply component memory.

11. The method of claim 10, wherein the light source emitters comprise light emitting diodes (LEDs).

12. The method of claim 10, further comprising determining if the configuration information from the light head is valid.

13. The method of claim 10, wherein the configuration information comprises at least one of two or more operational modes, LED drive current, flash pattern information, forward voltage, life data or junction temperature information.

14. A system comprising:
    a means for storing light source emitter configuration information in memory located in a light head;
    a means for sending the stored light source emitter configuration information to a power supply component via a data bus;
    a means for receiving the sent light source emitter configuration information at the power supply component;
    a means for receiving an input electrical signal at a power converter in the power supply component;
    a means for storing light source emitter configuration information in a memory associated with the power supply component; and
    a means for converting the received electrical signal based on at least one of the configuration information stored in the power supply component memory or the configuration information received from the light head;
    a means for applying the converted electrical signal to one or more light source emitters associated with the light head; and
    a means for overwriting the configuration information stored in the power supply component memory if the configuration information from the light head is different from the configuration information previously stored in the power supply component memory.

15. The system of claim 14, wherein the light source emitters comprise light emitting diodes (LEDs).

16. The system of claim 15, further comprising a means for determining if the configuration information from the light head is valid, wherein the configuration information comprises at least one of two or more operational modes, LED drive current, flash pattern information, or forward voltage.

17. The system of claim 15, wherein the configuration information further comprises LED life data and junction temperature information.

* * * * *